United States Patent [19]

Henneberger et al.

[11] Patent Number: 5,008,058

[45] Date of Patent: Apr. 16, 1991

[54] METHOD FOR MANUFACTURING AN OTOPLASTIC OR AN EAR ADAPTOR MEMBER

[75] Inventors: Hans Henneberger, Effeltrich; Rainer Basel, Erlangen, both of Fed. Rep. of Germany

[73] Assignee: Siemens Aktiengesellschaft, Berlin and Munich, Fed. Rep. of Germany

[21] Appl. No.: 299,069

[22] Filed: Jan. 19, 1989

[30] Foreign Application Priority Data

Jan. 19, 1988 [DE] Fed. Rep. of Germany ....... 3801392

[51] Int. Cl.[5] .............................................. B29C 41/22

[52] U.S. Cl. .................................... 264/134; 264/135; 264/222; 264/255; 264/279; 264/313; 425/2

[58] Field of Search ............... 264/222, 135, 134, 255, 264/279, 313; 425/2

[56] References Cited

U.S. PATENT DOCUMENTS

| | | | |
|---|---|---|---|
| 3,131,241 | 4/1964 | Mendelson | 264/257 |
| 3,440,314 | 4/1969 | Frisch | 264/222 |
| 3,513,269 | 5/1970 | Wilson | 264/222 |
| 4,006,796 | 2/1977 | Coehorst | 264/222 |
| 4,130,741 | 12/1978 | Gottlieb | 264/222 |
| 4,372,904 | 2/1983 | Gunn | 264/222 |
| 4,608,217 | 8/1986 | Csiki | 264/249 |
| 4,712,245 | 12/1987 | Lyregaard | 264/222 |

FOREIGN PATENT DOCUMENTS

| | | | |
|---|---|---|---|
| 127274 | 6/1947 | Australia | 264/222 |
| 2459259 | 4/1929 | Fed. Rep. of Germany . | |
| 1231304 | 12/1966 | Fed. Rep. of Germany . | |
| 2084072 | 4/1982 | United Kingdom | 264/222 |
| 2091063 | 7/1982 | United Kingdom . | |

OTHER PUBLICATIONS

Voroba, "A Tool for the Optimization of Hearing Aid Fittings", *Hearing Instruments,* vol. 35, No. a, 1984, pp. 12-16.

Sale Brochure for "3M COMPLY TM Instant Earmold", 3M Hearing Components and Disposables-(7-0-2008-2478-0(77.5)11 ).

Smolak et al., "Disposable Foram Earmolds", *Hearing Instruments,* vol. 38, No. 12, 1987, pp. 24–27 and 49.

*Primary Examiner*—Jay H. Woo

*Assistant Examiner*—Jeremiah F. Durkin, II

*Attorney, Agent, or Firm*—Hill, Van Santen, Steadman & Simpson

[57] ABSTRACT

A method for forming a part inserted in the auditory canal of a hearing impaired person, said part being either an otoplastic or a carrier part of the hearing aid insertable into the auditory canal or an ear adaptor member for a hearing aid to be worn behind-the-ear, characterized by providing an expandable elastic member, coating said elastic member with a hardenable material, inserting the coated member into an ear of the person who is hearing impaired, allowing the hardenable material to harden to retain the outside contour of the part. The elastic expandable member may be either a porous member which is partially saturated on the outer surfaces or may be a smooth member which is coated with the hardenable material. If desired, a physiologically compatible coating may be applied onto the hardened surface layer subsequent to the hardening process.

14 Claims, 4 Drawing Sheets

METHOD FOR MANUFACTURING AN OTOPLASTIC OR AN EAR ADAPTOR MEMBER

BACKGROUND OF THE INVENTION

The present invention is directed to a method of manufacturing an otoplastic or an ear adaptor member by providing an elastic-shaped part that can be placed on a carrier member or mandrel. It is likewise directed to an otoplastic for a hearing aid and to an ear adaptor member for a hearing aid which is worn behind the ear and has the ear adaptor extending into the ear canal. The carrier part, for example, can be a housing of an in-the-ear hearing aid, for example which is custom made or the shell of a module of an in-the-ear hearing aid or the sound line of the behind-the-ear hearing aid.

Otoplastics and customized ear adaptor members are particularly employed when adapting a hearing aid to the shape of the auditory canal of the ear of the hearing impaired person. Such otoplastics and ear adaptor members, first, function to fix the position of the hearing aid so that the hearing aid cannot slip out or even fall out of the ear. In addition, the otoplastic of the ear adaptor member has a sound dampening effect in order to prevent feedback between the microphone and the ear phone of the hearing aid. Otoplastics are generally formed as an adaptation to the in-the-ear hearing aids (ITE devices), which otoplastics are in contrast to the ear adaptor members which are used for the behind-the-ear hearing aids (BTE devices).

In standard manufacturing methods of otoplastics and customized ear adaptor members, an impression of the auditory canal of the ear of the hearing impaired person to be fitted therewith is first made. A negative then is formed from this first impression. Only then can the otoplastic or the ear adaptor member, which is adapted to the shape of the auditory canal of the ear, be manufactured from this negative. After the manufacture, the otoplastic or ear adaptor member must also be frequently cut or ground in order to eliminate casting errors. Since this process is expensive and time-consuming, many manufacturers have been attempting for some time to develop a method wherein the manufacturing of the formation of the first impression and the negative of the first impression can be eliminated or avoided.

Thus, for example, German AS 12 31 304 discloses a method in accordance wherein a self-curing plastic is distributed on a base member simulating the basic structure of the auditory canal of the human ear and the coated base member is subsequently inserted directly into the auditory canal of the ear of the hearing impaired person and held there until the plastic has now adapted to the inside contour of the auditory canal and has hardened. The adaptation to the inside contour, however, is not yet optimum. There is the risk of pressing plastic too far into the auditory canal due to the impression of the plastic coated basic form into the ear.

In this method, moreover, a multitude of different standard base members are required, since the plastic coating is not adequate in order to sufficiently adapt to all shapes of auditory canals upon employment of a single base member of mandrel. The analogous case applies to the subject matter of the article by Dr. Barry Voroba, "A Tool for the Optimization of Hearing Aid Fittings", *Hearing Instruments*, Vol. 35, No. 1, 1984, pp 12, 13, 14 and 16. In this case, the soft plastic material is injected into an ear. A suitable die is then pressed into this compound before it hardens.

U.S. Pat. No. 4,006,769, whose disclosure is incorporated by reference and which claims priority from the same Netherlands Application as German AS 24 59 259, discloses another possibility of manufacturing an ear adaptor member without utilizing the impression and a negative. Instead of an otoplastic, the sound canal of a hearing aid is held in the auditory canal with a surrounding liquid-filled pocket or bag. The pocket is adapted to the shape of the auditory canal in that a pressure ring is pressed against the material of the pocket. However, a disadvantage of this particular solution is that the liquid in the pocket does not harden. Thus, there is always the risk that the pocket will tear and the liquid will run out into the ear.

Another method for directly taking the shape of an auditory canal without utilizing the impression and the negative is disclosed in copending U.S. patent application Ser. No. 185,794, filed Apr. 22, 1988, which issued on Oct. 3, 1989 as U.S. Pat. No. 4,871,502 and which was based on German Patent Application P 37 15 082.0. The method disclosed in this application involves injecting a flowing otoplastic material between a die and a sheath drawn over the die and allowing this to harden while the sheath and die are positioned in the ear.

Shaped parts of expanded plastic for ear adaptor members have been developed in recent time. Such shaped parts of expanded plastic have already been known for some time as anti-noise plugs and are manufactured in mass production. An adaptation to the individual auditory canal is not carried out. The expanded plastic parts are merely pressed together and inserted into the ear, whereupon they will again expand and swell. Included among the manufactures of such expanded plastic parts are Grace Chemie, Heidelberg, and 3M, USA. The device manufactured by 3M is disclosed in a sales sheet entitled "COMPLY™ Instant Earmold", No. 70-208-2478-0 (77.5) 11, and is also discussed in an article by Sholak et al "Disposable Foam Earmolds", *Hearing Instruments*, Vol. 38, No. 12, 1987. However, such expanded plastics are less suitable as a pure otoplastic replacement for an in-the-ear hearing aid, since the expanded plastic is too soft. In addition, such expanded plastics are quickly contaminated, such as by cerumen, and must be frequently replaced. Such expanded plastics are not yet optimumly used, even as ear adaptor members.

SUMMARY OF THE INVENTION

An object of the present invention is to provide a method for the manufacture of either an otoplastic or of a customized ear adaptor member utilizing expanded plastics that can be implemented without the manufacturing of an impression of the ear canal and of a negative of the impression and which method does not exhibit the disadvantages set forth hereinbefore. It is also an object of the present invention to provide an ear adaptor member, as well as an otoplastic, that are manufactured of expanded plastic as a durable adaptor part with little cost.

The objects of the invention are achieved with an improvement in a method for the optimum manufacture of a member for insertion into the ear canal including customized ear adaptor members and otoplastics, said method utilizing a carrier part and at least a partially expandable elastic shaped part that is placed in the carrier part. The improvements comprise coating a portion of the elastic expandable part with a hardenable material, inserting the part with the coating into the ear of the hearing impaired person and allowing the hardenable material to harden. By utilizing a partially porous expandable plastic member, it can be moistened with the hardened material, which will harden to retain the shape of the outside contour after removal of the part or otoplastic from the ear. If an ear adaptor member is being formed, this member is of a partially porous expanded plastic that is moistened with the hardenable material and it will retain the adapted outside contour, even after the ear adaptor member has been removed from the ear.

Otoplastics, as well as ear adaptor members, can be manufactured in an especially beneficial way by moistening a porous, elastic formed part with a hardenable material. The moisture formed part can be adapted to the auditory canal without complicated mechanisms. It is simply positioned in the ear until it hardens, which takes approximately 10 minutes. This saves both the time, as well as cost. Differently shaped base members, likewise, are not required, since a uniform shaped base member or even the in-the-ear hearing aid itself can be utilized, given otoplastics or when sound lines are being employed given the adaptor member. Since the material is bonded to the formed part, the adaptation of the auditory canal is less problematical then in the prior art. In case of using less physiologically compatible material, the method includes drawing a protective sheath over the moistened formed part to prevent contact between the hardening material and the patient's ear. Subsequent to the step of hardening, the sheath is then removed.

The manufactured otoplastics and the ear adaptor members are also especially advantageously seen from a technological point of view. Since the elastic-shaped part constantly presses outward against the walls of the auditory canal during the hardening of the moistening material, the adaptation is particularly exact. Since a hard member occurs from the formed part in a few minutes, the elasticity, however, is only temporarily required. The formed part, accordingly, seals the auditory canal in an especially good way and this, in turn, prevents feedback effects between the microphone and the earphone.

Moreover, the otoplastics and/or ear adaptor members manufactured in accordance with the present invention can be used over a long time without having to be replaced, particularly, when the formed part is coated with a polymer after removal from the ear and if a protective sheath has been used after removal of the protective sheath.

Other advantages and details of the invention will be readily apparent from the following description of the preferred embodiments, the drawings and the claims.

BRIEF DESCRIPTION OF THE DRAWINGS

FIG. 2 being a perspective view showing the removal of excess hardening material from the elastic part;

FIG. 3 being a perspective view showing the placing of a sheath on the moistened part;

FIG. 4 being a diagrammatic view showing the insertion of the part into the auditory canal;

FIG. 5 being a diagrammatic view similar to FIG. 4 showing the expansion of the part in the auditory canal;

FIG. 6 being a perspective view showing the removal of the sheath after the hardening of the material;

FIG. 7 being a perspective view coating the hardened sheath with a coating to fill the pores; and FIG. 8 being a diagrammatic view showing the replacing of the form with the ear plug;

DESCRIPTION OF THE PREFERRED EMBODIMENTS

Figure 1:
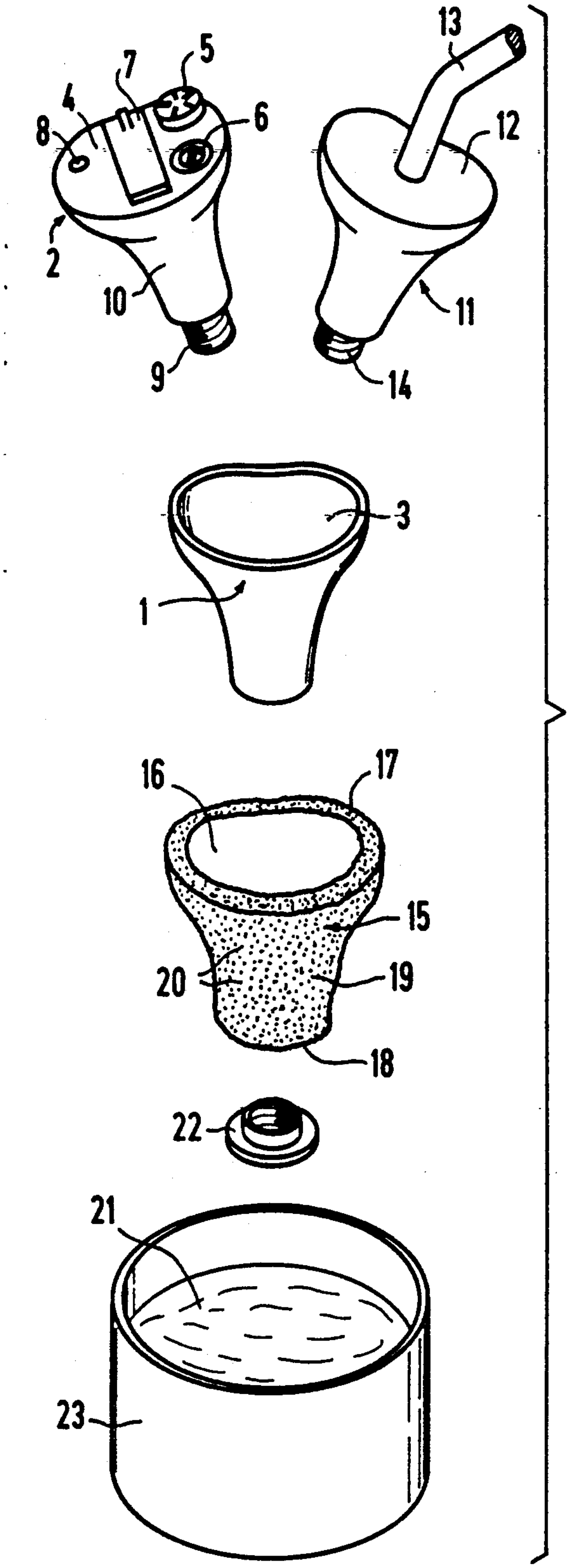
FIGS. 1-8 show various steps in the process for the manufacture of otoplastics in a first embodiment of the invention, with FIG. 1 being an exploded view showing the parts as they are about to be moistened with the material.

The critical method steps for manufacturing of an otoplastic for an in-the-ear hearing aid are illustrated in FIGS. 1-8. A carrier part, generally indicated at 1, an elastic, porous formed part, generally indicated at 15, and a hardenable material, are initially required for the manufacture of the otoplastic. The carrier part 1, in the embodiments shown in FIGS. 1-8, comprises a shell of a module for an in-the-ear hearing aid 2 of, for example, the type sold by Siemens AG under the trade name "Cosmea M". The shell 1 is composed of a shape-stable material and is adapted to the shape of the module 2. The shell 1 has an interior 3 which is opened in an outward direction at both ends of the shell. If the manufacture of the otoplastic of a different in-the-ear device does not utilize a shell, for example, the hearing aid housing or, correspondingly, a shaped base member can serve as the carrier part.

The ITE hearing aid module 2 comprises all the electrical components of the hearing aid. As illustrated, it has an adjustment knob 5 for a volume control, a second actuator 6, a flap or lid 7 for a battery compartment and a sound entry aperture 8 that leads to the microphone of the device 2 which is located adjacent the end face 4 of the device. A connecting piece 9 that forms a sound exit aperture, is located at the opposite end of the hearing aid 2. A sound exit connector 9 is a component part of a housing 10, and may be of the same plastic as the hearing aid module 2.

In order to facilitate manipulation during manufacture of the otoplastic, the shell 1 is slipped over a base member or mandrel 11. The base member !1 is a uniform die manufactured in mass production, whose outside contour is identical to the outside contour of the hearing aid module 2. The base member 11 has a stem 13 at an end face 12 and has a connector part 14 at its opposite end.

The shaped part is an elastomer collar 15 having pores. It is pre-shaped to the shape of the auditory canal of the human ear, but has a somewhat larger diameter or size. The collar 15 surrounds a recess 16 that corresponds to the shape of the shell 1. The collar has edges 17 and 18 which, preferably, diminish the size of the recess 16 at the open ends of the collar 15 and, after the collar 15 has been slipped over the shell and over the base member 11, thus, holds these in the recess 16. The collar 15 is an absorbent, expanded plastic and, in this exemplary embodiment, is open-celled at its surface 19. The expanded plastic can be manufactured of various materials. Examples are polyurethane elastomer or a foamed latex. The collar 15 is initially elastic and, preferably, swellable and comprises many small pores 20.

A hardenable material 21, for example a polymer, is provided in a suitable container 23. The hardenable material 21 is, preferably, viscous. A resin material has proven extremely satisfactory for this material.

As already indicated, the base member 11 is, first, plugged into the interior 3 of the shell 1. The shell, together with the base member 11, is then covered by the plastic collar 15. For stabilization and for forming a seal, a protective cover 22 is subsequently screwed onto the connector piece 14 of the base member 11.

Figure 2:
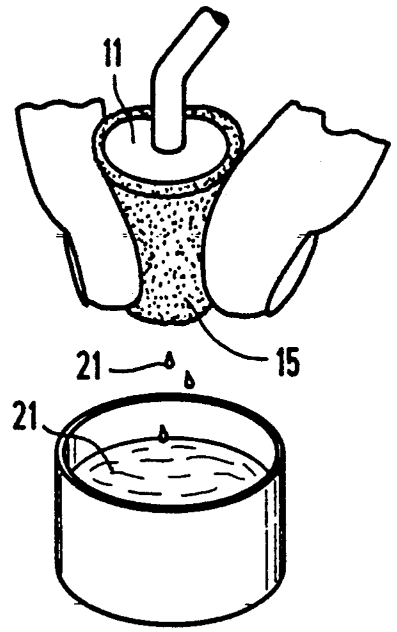
Figure 3:
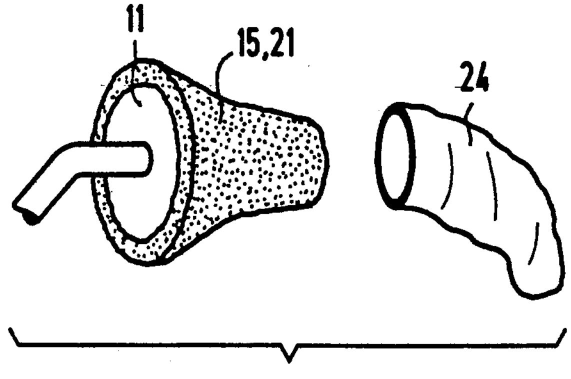

The collar 15 in this condition is then immersed into the liquid container 23 until the pores 20 are moistened with the hardenable material 21. The collar 15 must absorb at least enough hardenable material 21 that it can no longer deform after the curing of the hardenable material. The pores 20 should not be completely filled with the hardenable material 21. In those cases in which the expanded plastic 15 is especially pliable, the pores 20 merely have to be moistened with the hardenable material 21. As shown in FIG. 2, excess material 21 should be pressed out of the collar 15 under certain conditions after the immersion of the collar 15 in the container 23 containing the material 21. The collar 15 can also be dipped into the material 21 while in a compressed condition. The method step of FIG. 2 would then be eliminated.

If a less physiologically compatible material 21 is utilized, a protective sheath 24 (FIG. 3) is drawn over the moistened collar 15 before insertion of the collar into the auditory canal. The protective sheath 24 should, preferably, also be elastic and adapt exactly to the outside contour of the collar 15. Such a protective sheath 24 can be fabricated, for example, of latex or of a polyisoprene or polybutadiene.

Figure 4:
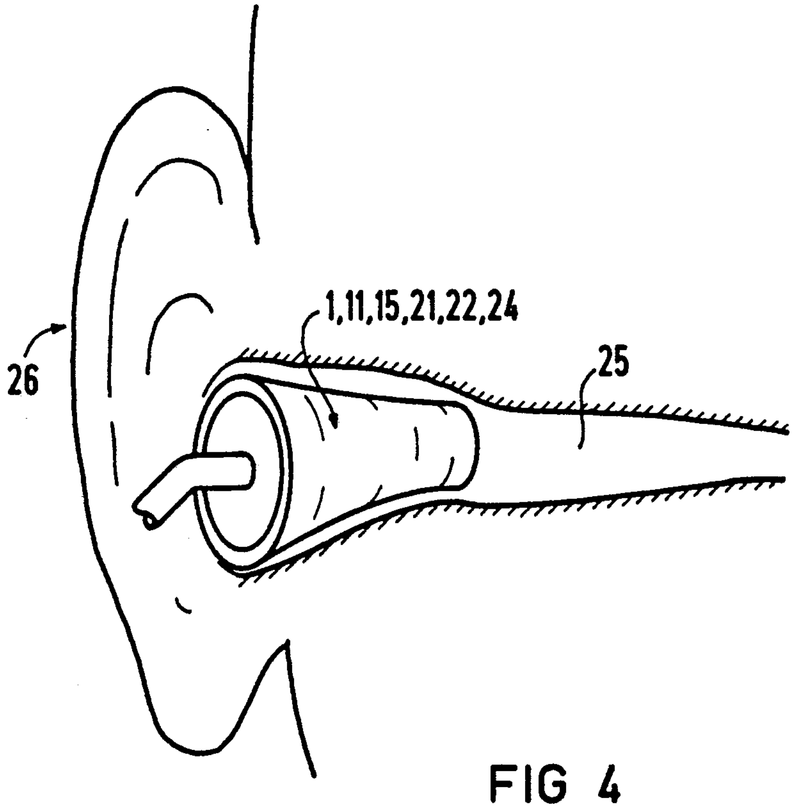

The overall member composed of the base member 11, the shell 1, the collar 15, the material 21, the protective end cover 22 and, as warranted, the protective sheath 24, is ultimately positioned in the auditory canal 25 in the ear 26 of a hearing impaired person, as illustrated in FIG. 4.

Figure 5:
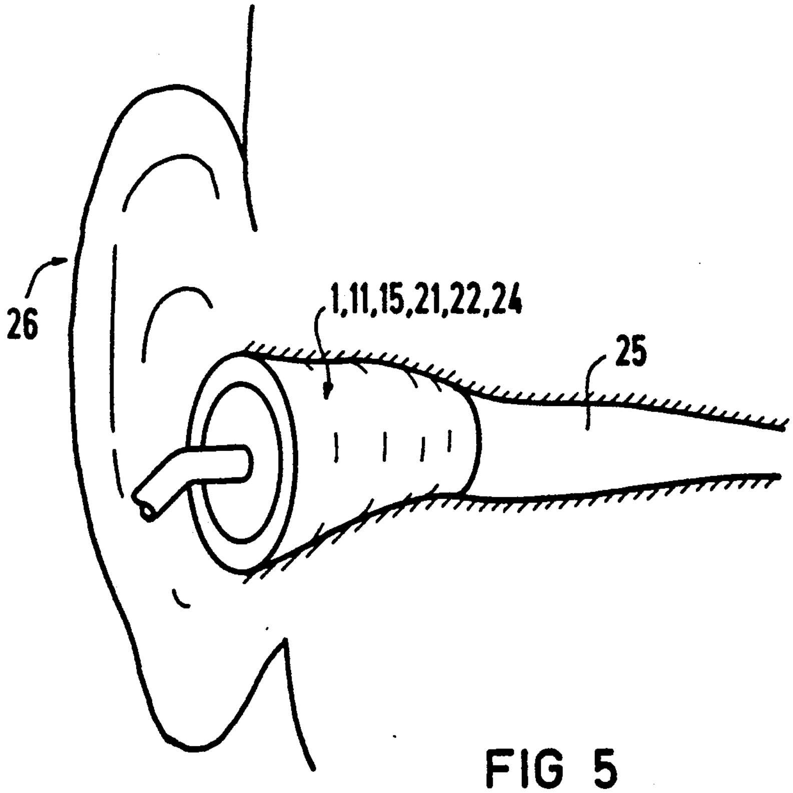
Figure 6:
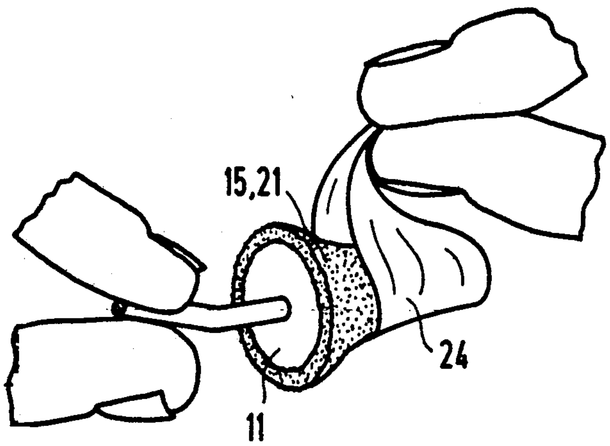

As illustrated in FIG. 5, the overall member or assembly of the members 1, 11, 15, 21, 22 and 24, after a few minutes, has expanded to fill the canal. The elastic collar 15 has, again, swelled up to the wall of the auditory canal and the hardenable material 21 will start curing at this time. After about 10–15 minutes in the ear, the material 21 has completely hardened. The assembled overall members 1, 11, 15, 21, 22 and 24 can be subsequently removed from the canal 25. The protective sheath 24 can then be removed by being subsequently pulled off from the collar 15, as illustrated in FIG. 6, and this removed sheath is then discarded. What remains is a base member 11 with a shell 1 and a hardened collar 15 that is permanently adapted to the shape of the auditory canal.

Figure 7:
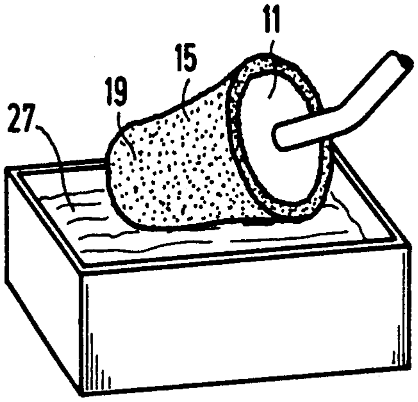

As illustrated in FIG. 7, a coating 27 is then applied onto the collar. Since the expanded plastic of the collar continues to be open-celled but hardened, the surface 19 of the collar 15 is somewhat rough. The coating 27 smooths the surface 19 so that the finished otoplastic is pleasant to wear. The coating 27, moreover, restores the exact fit that was lost due to the removal of the protective sheath 24. The coating 27 can be applied either in a dip method or in some other known fashion. In any case, the coating 27 should be a physiologically compatible material. A polymer, for example a reaction resin selected from a group consisting of a epoxy or acrylate, is a well-suited material for the coating. The coating 27, for example, can also be applied and have different colors in order to make the device more optically attractive.

Figure 8:
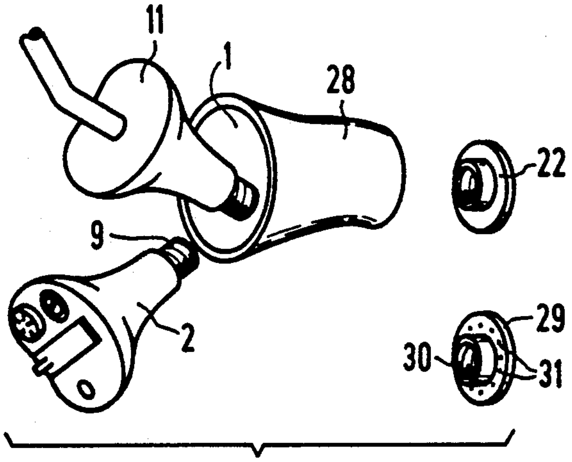

In the last method step, the base member 11 is removed from the finished otoplastic 28. The protective end cover 22 is first screwed off, as shown in FIG. 8. The base member 11 is then replaced by the hearing aid module 2. The shell 1 continues to remain in the otoplastic 28. In order to firmly retain the module 2 in the otoplastic 28 and in order to also protect the hearing aid from cerumen, which occurs in the ear, a cerumen cap 29 having inside threads 30 is screwed onto the connecting piece 9 of the module. The cerumen cap 29 has openings 31 for passage of the sound.

Figure 9:
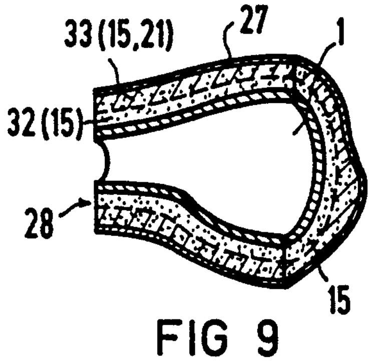
FIG. 9 is a longitudinal cross sectional view of the otoplastic part made in accordance with the method of FIGS. 1-8.

The otoplastic 28, as illustrated in FIG. 9, has an expanded plastic collar 15 that has a portion 32 which is an inner portion located adjacent the shell 1, which is not saturated by the hardenable material 21. The expanded plastic in this inner portion 32 continues to be soft and elastic. The expanded plastic, however, can no longer expand in an outward direction, since it is completely surrounded by a second, harder region or portion 33. This second region 33 was adequately moistened with the hardenable material 21 during the manufacturing process. After the material 21 is cured, the region 33 became so hard that a deformation of the otoplastic 28 is no longer possible. Additional coatings, such as 27, adhere to the region 33 of the expanded plastic and lend the otoplastic a smooth outer surface.

Figure 10:
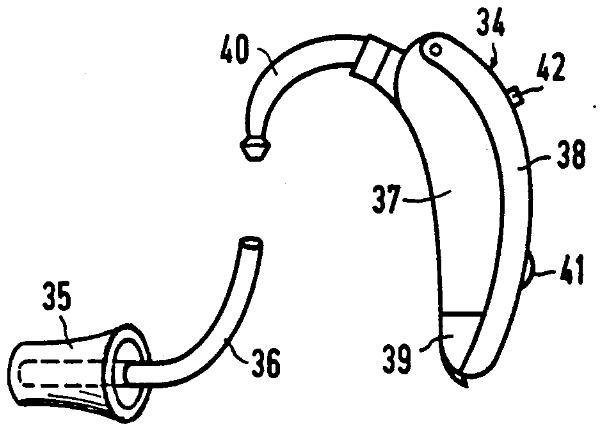
FIG. 10 is a perspective view of a behind-the-ear hearing aid, with an ear adaptor member of expanded plastic formed in a second embodiment of the invention.
Figure 11:
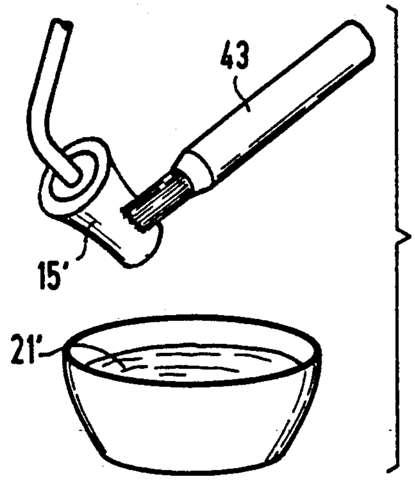
FIG. 11 is a perspective view showing the coating of the expanded plastic member with a hardenable material for the purpose of manufacturing the ear adaptor member of FIG. 10.
Figure 12:
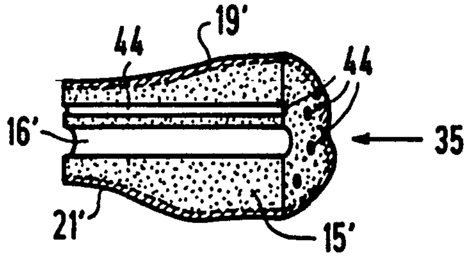
FIG. 12 is a longitudinal cross sectional view of an ear adaptor member manufactured in accordance with the present invention.

A modified method and procedure is shown in FIGS. 10–12. Although these method steps are suitable for manufacturing an otoplastic, an ear adaptor member for a behind-the-ear hearing aid is manufactured on the basis of this particular embodiment of the method. As illustrated in FIG. 10, a behind-the-ear hearing aid (a BTE hearing aid) 34 and an ear adaptor member 35, which has an expanded plastic member received on a sound conducting hose 36. The BTE hearing aid 34 has an inside shell or casing 37 and an outer casing portion 38, a battery compartment 39 and a carrying hook 40. A volume control 41 and a switch 42 are provided on the outer portion or shell 38. After the sound-conducting hose 36 has been connected to the carrier hook 40, acoustical signals can be conducted from the BTE hearing aid 34 into the ear of the hearing impaired person via an ear adaptor member 35. Just like the otoplastic 38, the ear adaptor member 35 should be exactly adapted to the shape of the auditory canal of the hearing impaired person.

To this end, as shown in FIG. 11, a hardenable material 21' is applied with a brush 43 onto a collar 15' of expanded plastic fashioned as a formed part. As in the preceding exemplary embodiment, this material 21' is preferably a polymer and must be physiologically compatible, since no protective sheath is used therewith. The collar 15' prepared in this way is plugged into the auditory canal of the hearing impaired person for adaptation and hardening, as already set forth with regard to the embodiment illustrated in FIGS. 4 and 5. The ear adaptor member 35 of the invention, thus, will occur.

The ear adaptor member formed in accordance with the method of the present invention is shown by the member generally indicated at 35 in FIG. 12. In this case, a material 21' has hardly entered into the expanded plastic collar 15' and merely moistened the outer surface 19' of the collar 15'. To this end, thus, the collar 15' need not necessarily be open-celled. A collar 15' having a closed surface can also be utilized. The cured plastic material 21' in the present case, for example, has a smooth surface and, therefore, need not be further coated. In addition to the recess 16' for the sound conducting hose 36, the collar 15' in the present illustrated embodiment has a plurality of aeration channels 44, which surround the channel 16'.

Figure 13:
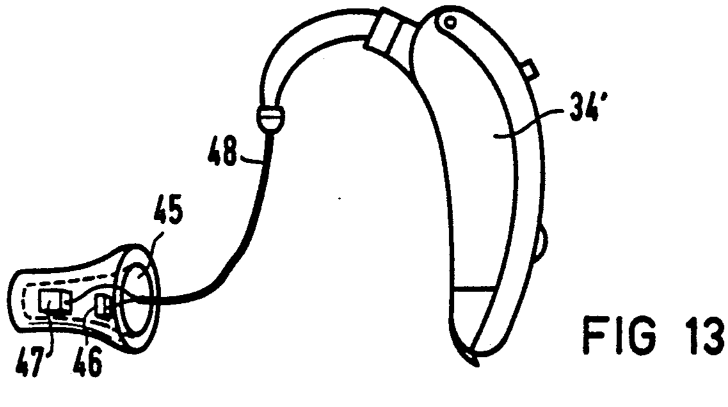
FIG. 13 is a perspective view of a modification of a behind-the-ear hearing aid of FIG. 10, in which the ear adaptor member has the sound lines replaced by a module having component parts.

As illustrated in FIG. 13, the carrier part can also be fashioned as a dislocated module 45 of a BTE hearing aid 34'. The dislocated module 45 preferably comprises a part of the electrical components of the hearing aid, particularly one or more electro-acoustical transducers, such as a microphone 46 and/or an earphone 47. In this case, the sound-conducting hose 36 is replaced by an electrical line 48, as illustrated.

Although various minor modifications may be suggested by those versed in the art, it should be understood that we wish to embody within the scope of the patent granted hereon all such modifications as reasonably and properly come within the scope of our contribution to the art.

We claim:

1. A method for manufacturing a customized ear adaptor member including an otoplastic and adaptor member, said adaptor member having an elastic-shaped part of a desired shaped placed on a carrier part, said method comprising the steps of providing an open-celled porous deformable part on a carrier part, said deformable part being slightly larger than an auditory canal of an ear of a hearing impaired person, at least partially saturating the deformable part with a liquid hardenable material so that said material is retained in said deformable part, then inserting the at least partially saturated deformable part and the carrier part into the auditory canal of the ear of the hearing impaired person and allowing the at least partially saturated deformable part to confirm to the canal as the hardenable material hardens to permanently conform the deformable part to the shape of the auditory canal of the ear of the person to form a permanently shaped part of the desired shape and then removing the formed, shaped part from the ear.

2. A method according to claim 1, wherein said deformable part has the form of a collar surrounding said carrier part.

3. A method according to claim 2, wherein, subsequent to at least partially saturating the deformable part with a hardenable material, said deformable part is slightly pressed to eliminate excess hardenable material prior to insertion into an ear.

4. A method according to claim 1, wherein said deformable part has a smooth outer surface.

5. A method according to claim 1, wherein the deformable part is an expanded plastic comprising a polyurethane elastomer.

6. A method according to claim 1, wherein the deformable part is an expanded plastic formed of foamed latex.

7. A method according to claim 1, which includes, subsequent to at least partially saturated the deformable part with the hardenable material and prior to insertion into the ear, the step of drawing a protective sheath over the at least partially saturated deformable part.

8. A method according to claim 7, wherein said protective sheath is an elastomer.

9. A method according to claim 7, which includes the step of removing the protective sheath after removal of the hardened part from said ear.

10. A method according to claim 9, wherein said hardened part, subsequent to removing the protective sheath, is coated with an additional physiologically compatible polymer.

11. A method according to claim 10, wherein said additional physiologically compatible polymer is a reaction resin selected from a group consisting of epoxy and acrylate.

12. A method according to claim 1, which includes, subsequent to hardening of the part and removal from the ear, coating said part with an additional physiologically compatible polymer.

13. A method according to claim 1, wherein the hardenable material comprises a polymer which is an initially viscous resin material which will become hardened.

14. A method according to claim 8, wherein said elastomer is latex.

* * * * *